April 30, 1929.   C. HOCH   1,710,874
CONVERTIBLE CARRIAGE WORK
Filed April 20, 1926   8 Sheets-Sheet 2
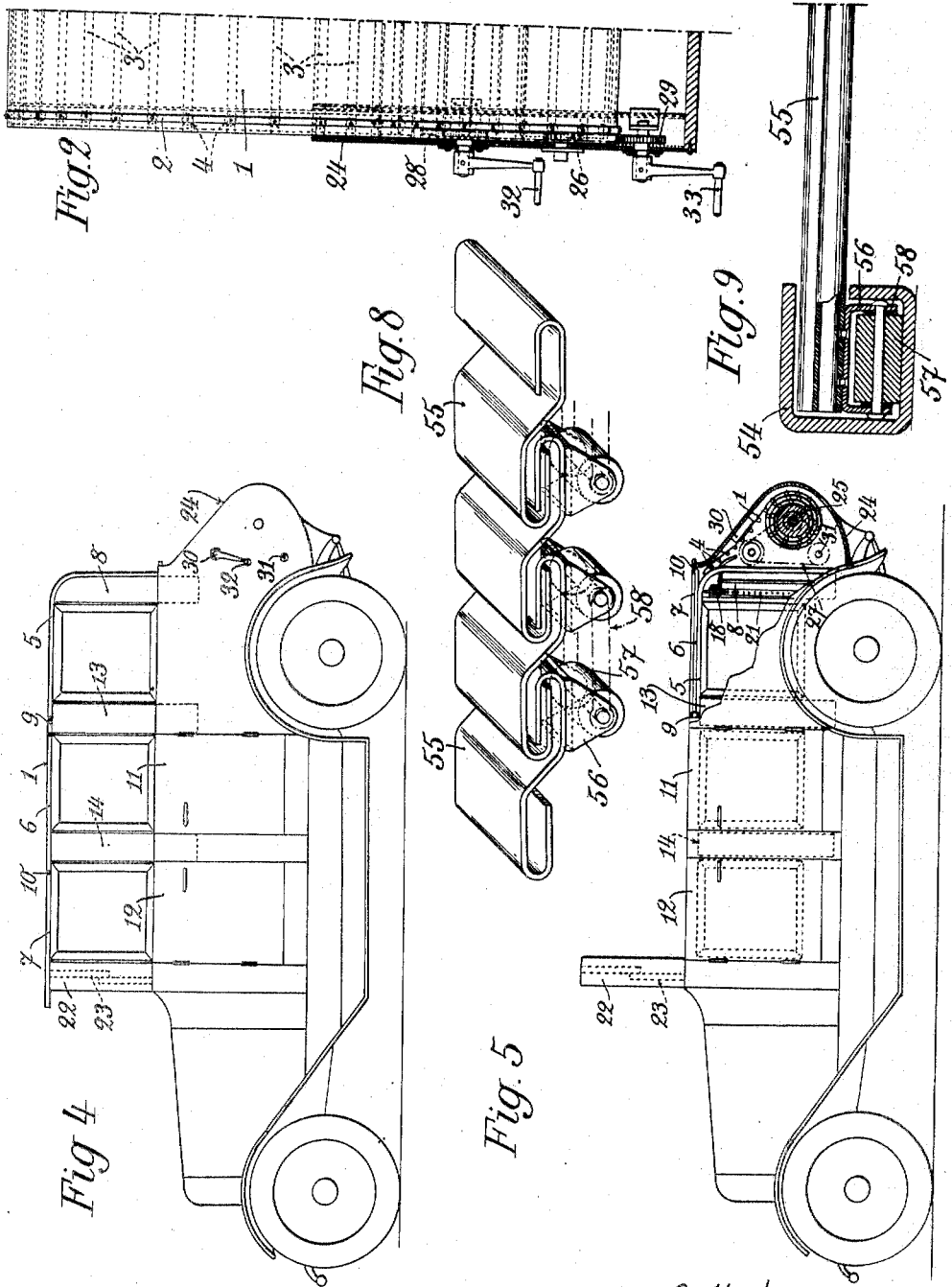
C. Hoch INVENTOR
By: Marks & Clerk ATTys

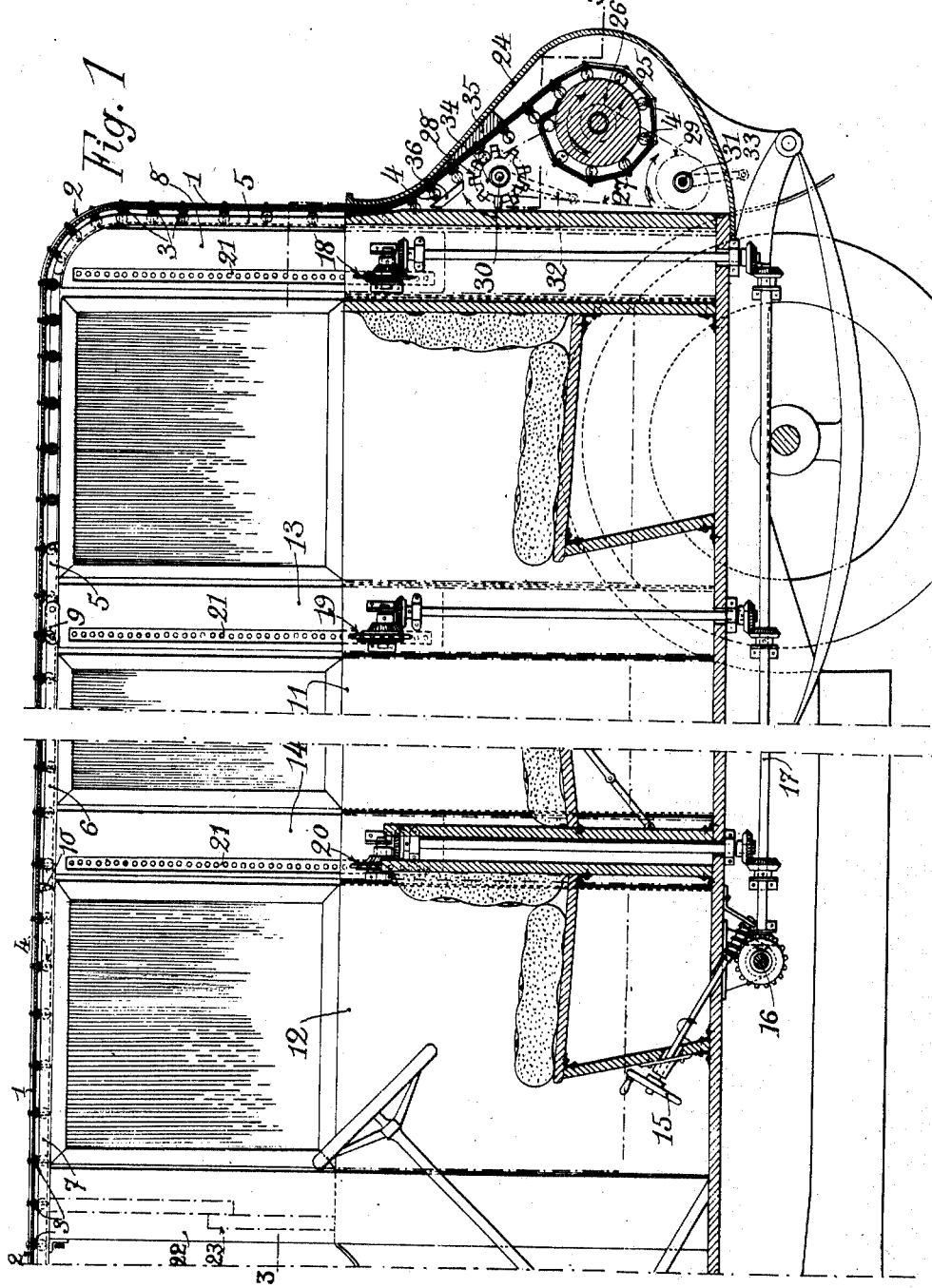

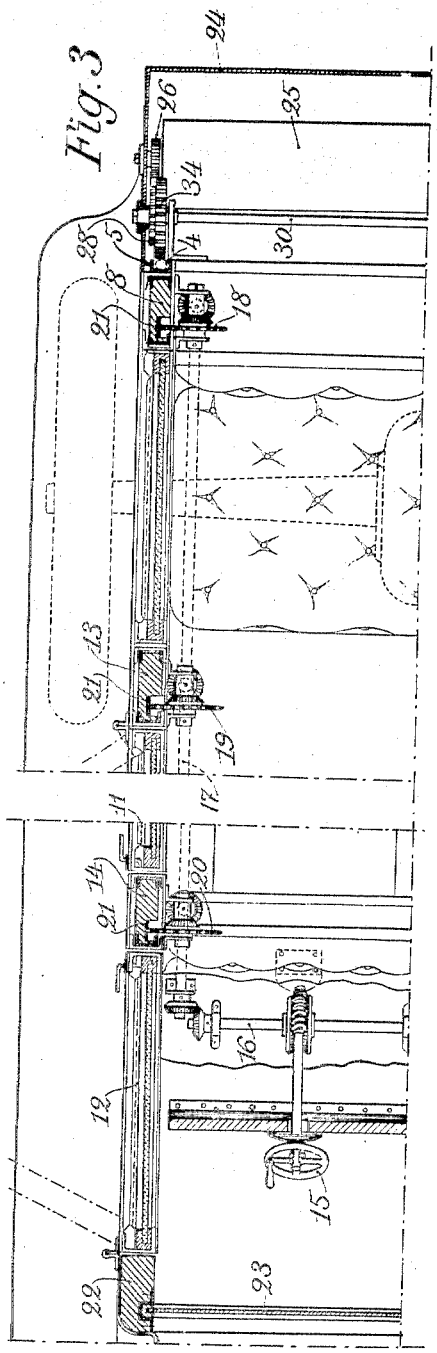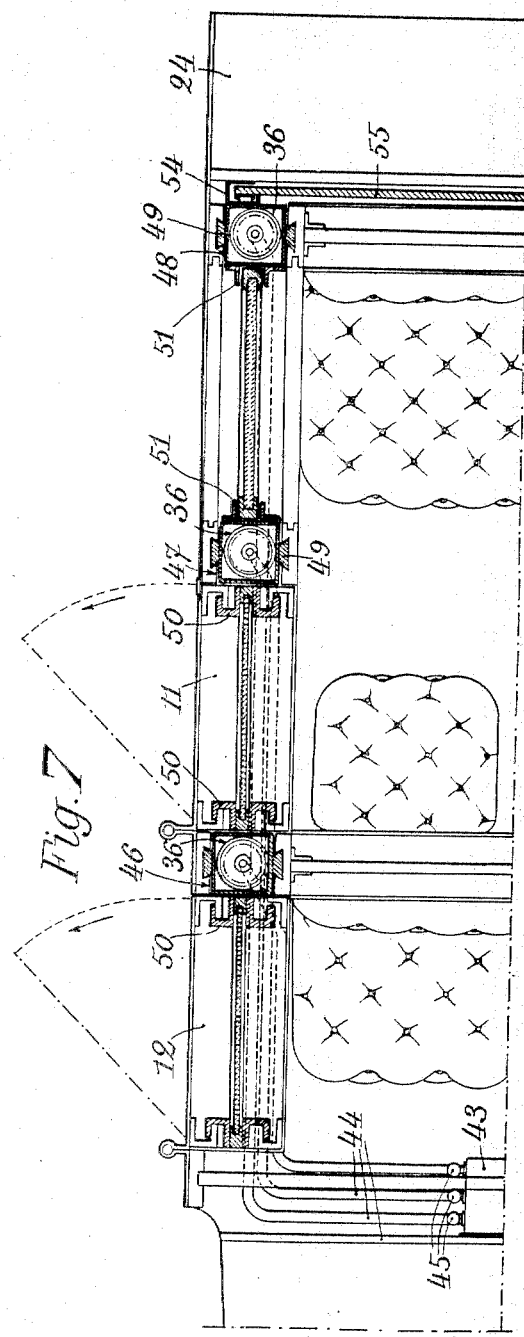

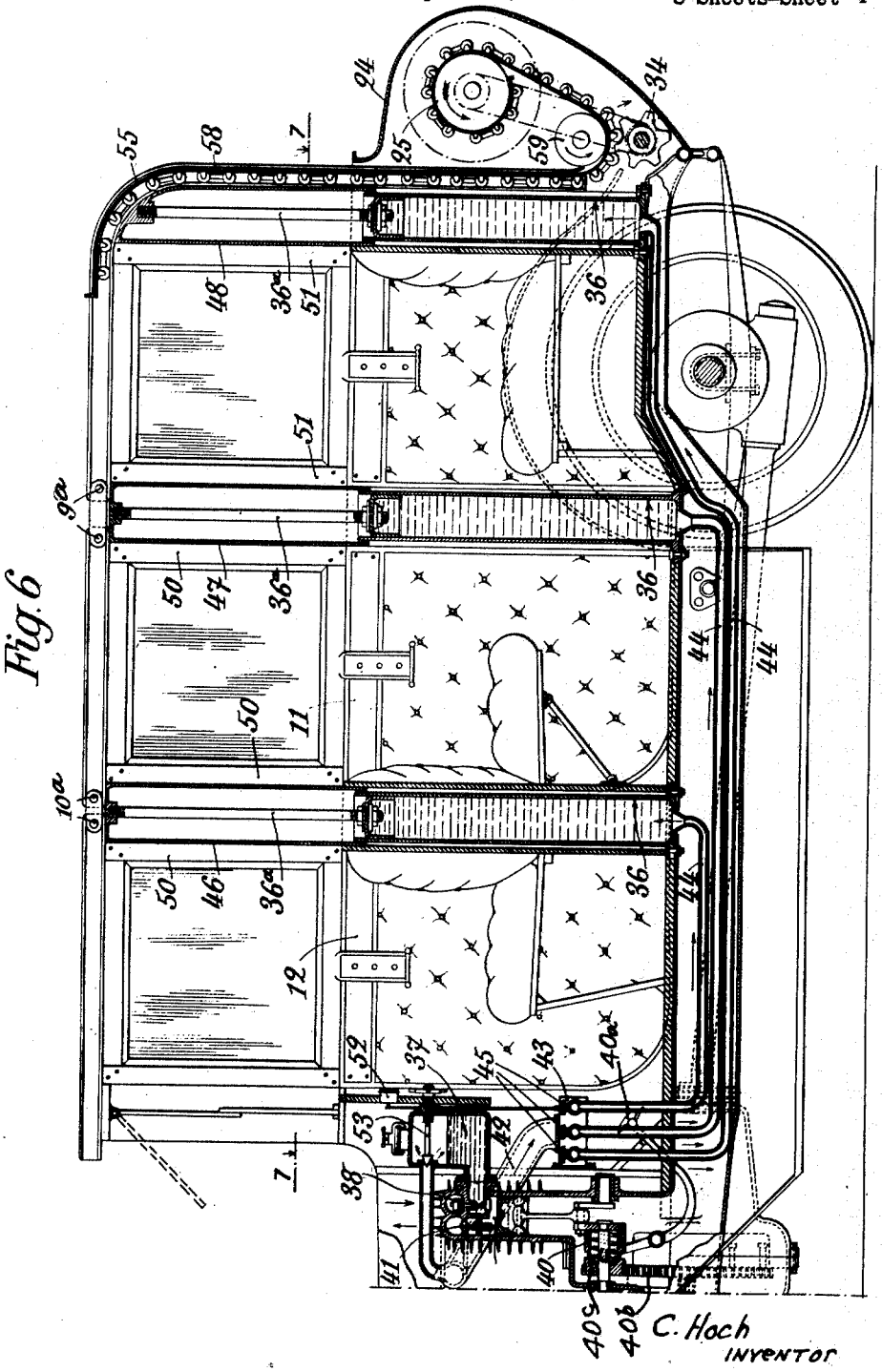

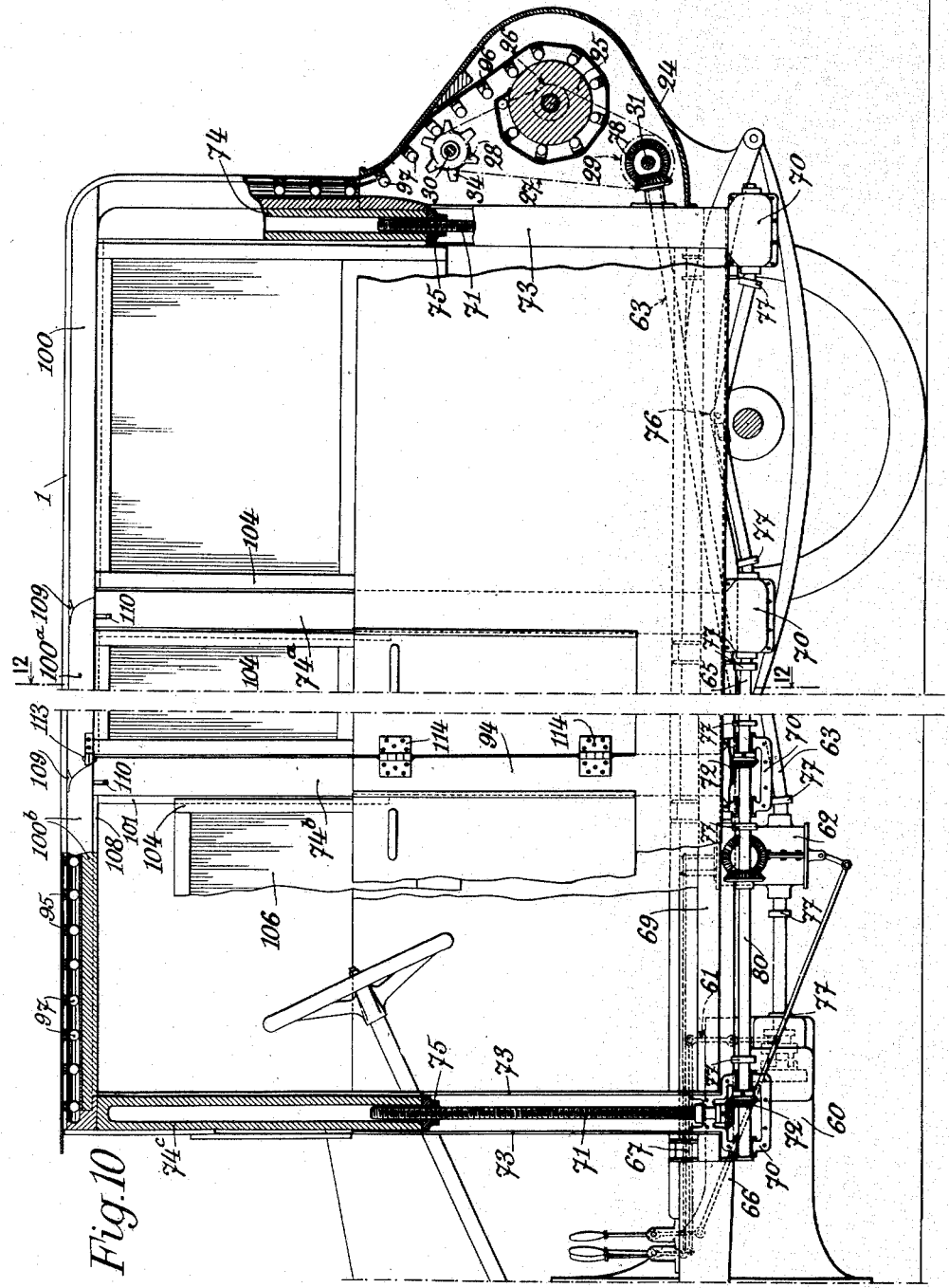

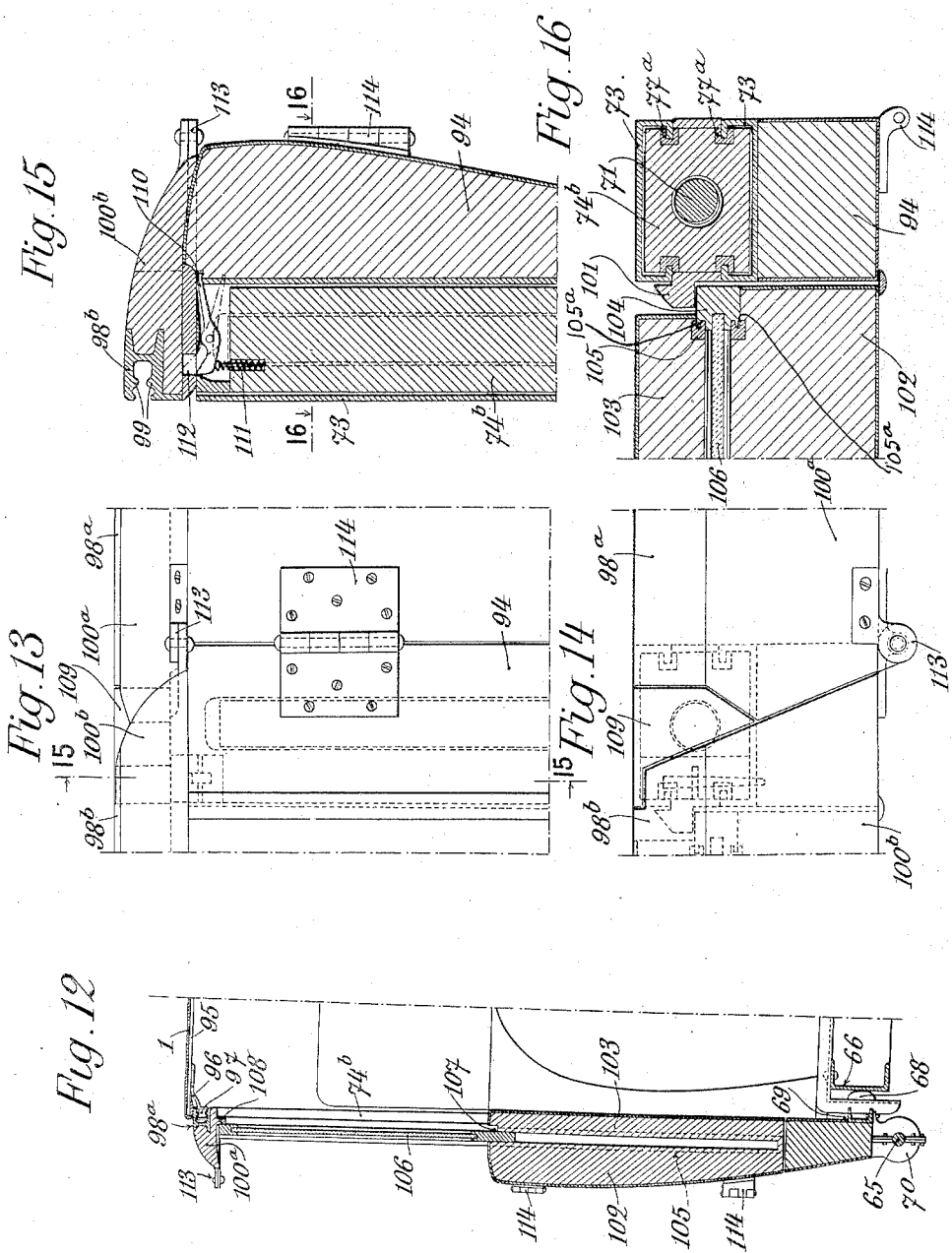

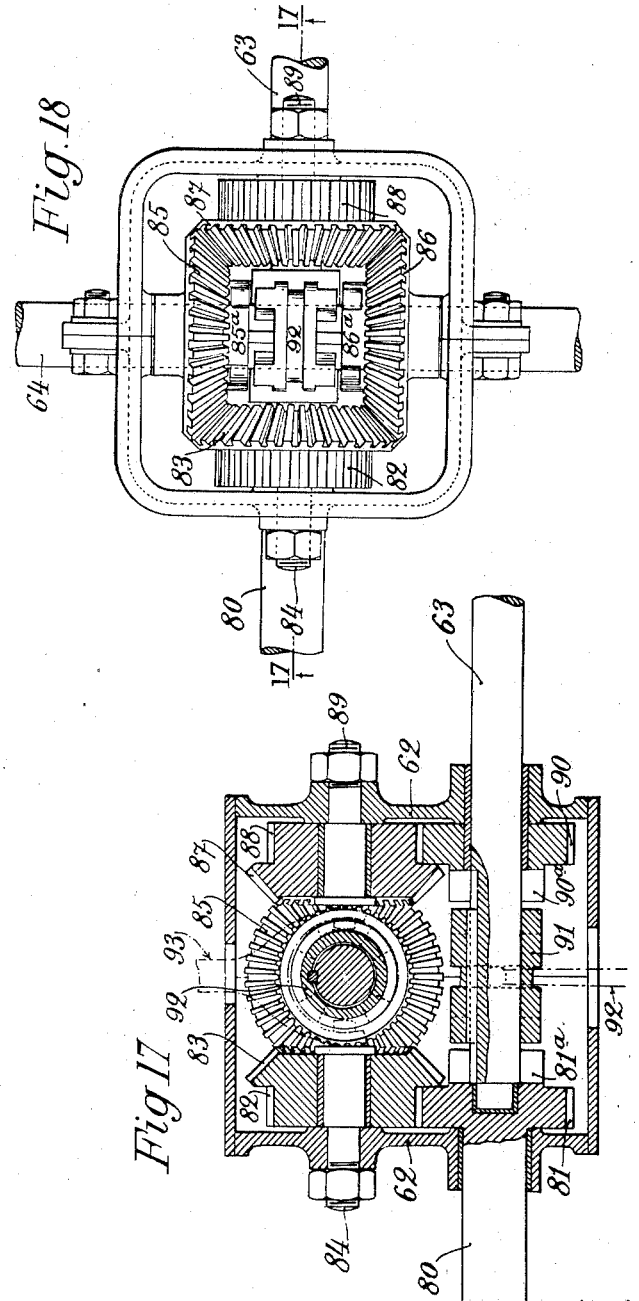

Patented Apr. 30, 1929.

1,710,874

UNITED STATES PATENT OFFICE.

CHARLES HOCH, OF VITRY-SUR-SEINE, FRANCE.

CONVERTIBLE CARRIAGE WORK.

Application filed April 20, 1926, Serial No. 103,337, and in France April 28, 1925.

My invention relates to a convertible carriage-work which is adapted for use with a motor vehicle frame, and is so arranged that when the hood in the extended position, the vehicle will have the exact appearance of a closed vehicle of the coupé, limousine or inside driving type.

For this purpose, the hood consists of a flat member or curtain consisting of leather or like material and provided with framing or strengthening parts whereby it may be wound upon a drum which is concealed in a casing mounted at the rear of the vehicle.

The edges of the hood are movable in pivoted guides in such manner that when the said guides are folded out, they will extend upon the whole or a part of the vehicle, and herein they are supported by vertically movable columns; these latter, as well as the said guides, are concealed in the walls of the vehicle body when the vehicle is converted into a torpedo. Suitable controlling means serve to raise and lower the several columns at the same time.

Due to the divided arrangement of the guides and to the disposition of the columns and the flexible hood, the doors and the glass windows can be always opened and closed, irrespectively of the transformation of the carriage-work.

The appended drawings show by way of example three embodiments of the invention.

Fig. 1 is a lengthwise section of the vehicle.

Fig. 2 is a partial rear elevation, with the casing removed.

Fig. 3 is a partial horizontal section on the line 3—3 of Fig. 1.

Fig. 4 is a diagrammatic elevational view of the closed vehicle.

Figure 11:
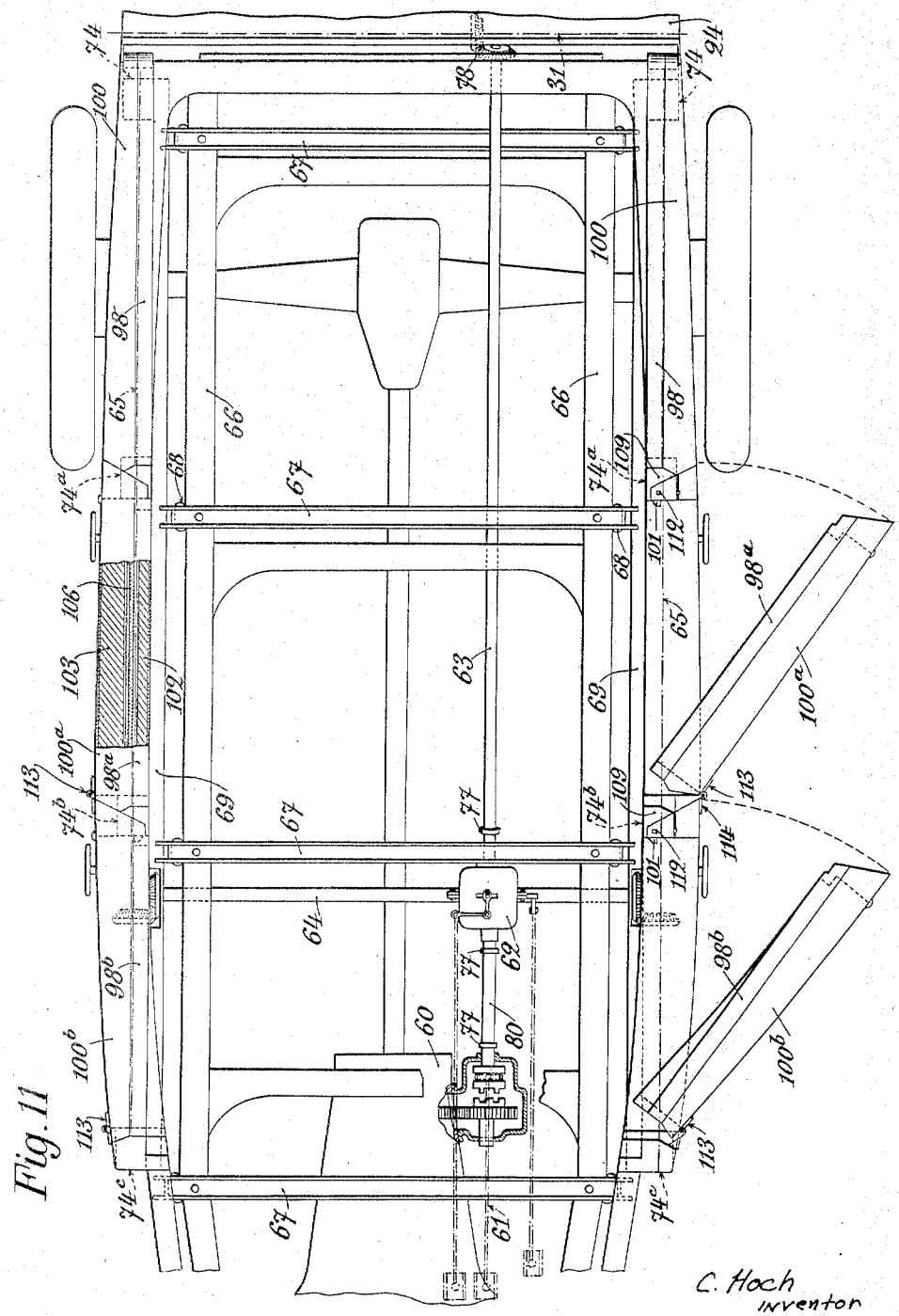

Fig. 5 is a like elevational view with parts broken away and the hood withdrawn.

Figs. 6 to 9 show the second construction.

Fig. 6 is a lengthwise section of the vehicle, with the columns raised and the hood partly extended.

Fig. 7 is a partial horizontal section on the line 7—7 of Fig. 6.

Fig. 8 is a partial perspective view of the metal curtain of the hood.

Fig. 9 is a vertical section of one of the guides of the hood.

Figs. 10 to 18 relate to the third construction.

Fig. 10 is an elevational view of the carriage body, with parts broken away.

Fig. 11 is a plan view, the curtain being removed, the columns lowered and the doors on one side of the vehicle opened.

Fig. 12 is a partial cross-section of the vehicle with the hood extended.

Figs. 13, 14, 15 are respectively an elevational and a plan view and a vertical section on a larger scale of a detail of the vehicle body showing the assembling of two guide parts with a column and with the vehicle body.

Fig. 16 is a partial cross section on the line 16—16 of Fig. 15.

Figs. 17 and 18 are respectively a vertical section and a plan view of a set of gearing for the control of the columns.

As shown in Figs. 1 to 5, the vehicle hood consists of a leather sheet or curtain 1 which is provided adjacent each of its lateral edges with a strip of spring steel 2; said strips are cross-connected by the transverse members 3 which may be of spring steel and are secured to the strips 2 by riveted axles upon which are revoluble the spherical rollers 4.

The said rollers are slidable in two guides, each of which consists of three U iron members 5, 6 and 7. The first member, which has a suitably curved outline, is secured to the upper ends of the two columns 8 and 13; the second is link connected at 9 to the first, and the third is pivoted at 10 to the second, so that when the said slides are folded and the columns 8 and 13 are caused to disappear within the vehicle body, by means of the mechanism to be further described, the different movable parts will occupy the position shown at the part which is broken away in Fig. 5.

Between the doors 11 and 12, at each side of the vehicle, is provided a column 14 which may be raised at the same time as the columns 8 and 13 into the position shown in Figs. 1 and 4 in order to support the slides, or may be lowered and caused to disappear within the box part provided for the purpose.

The said columns are raised and lowered by means of a mechanism which comprises a hand wheel 15 disposed under the driver's seat, so that he is enabled to actuate a cross shaft 16 by means of worm gearing.

To the ends of the said shaft are keyed bevel gear wheels engaging like wheels keyed to the adjacent ends of longitudinal shafts 17, one of which is provided on each side of the vehicle though but one is shown. Each shaft 17 actuates pinions 18, 19, 20 through suitable auxiliary bevel gearing and shafts controlling the respective columns 8, 13, 14.

For this purpose the pinions carry at the periphery a set of teeth or studs coacting with racks formed by the metal strips 21 which are regularly apertured.

The front end of the guide, that is to say the portion 7, will rest upon and is detachably secured to a stationary column 22 carrying the wind shield, known per se.

At the rear of the vehicle body is mounted a box part 24 in which is transversely disposed a drum 25 upon which the hood or curtain is wound (Fig. 5). The shaft of the drum 25, which is mounted in suitable bearings, is rotated by two chain wheels 26 disposed at the respective ends of the drum, each being connected by a chain 27 with the respective chain wheels 28, 29.

The latter are mounted at the ends of the transverse shafts 30, 31 which are contained in the box 24 and may be turned by the respective handles 32, 33.

I have provided two handles so that the control device for the hood may be actuated in a convenient manner irrespectively of the height of the driver.

The hood is displaced in either direction by means of two pinions 34 which are mounted upon the shaft 30 and are adapted to engage the rollers 4 whose series forms a sort of rack. In its motion, the hood is maintained between two guides 35, 36 placed in the box 24 and in contact with the strips 2 and the rollers 4.

The several parts being as shown in Figs. 1 to 4, for the closed position of the vehicle, if it is desired to convert the vehicle into an open vehicle of the torpedo type, the driver turns one of the handles 32—33 according to the arrows (Fig. 1). The pinions 34—due to their engagement with the rollers 4—will cooperate with the drum 25 to which is secured the end of the hood 1, so as to draw upon the hood, and it will thus be wound upon the drum 25; he continues the operation until the front end of the hood is engaged in the box, while the pinions 34 are still engaged with the rollers 4.

The said guides are then folded down, and their different sections then rest upon the two columns 8, 13; the hand wheel 15 is then operated so that the said columns will disappear in their recesses in the walls of the vehicle body.

To convert the vehicle into a torpedo of the inside steering type, the driver proceeds with the contrary operation; due to the flexible framing of the hood, the latter will be drawn by the pinions 34 and will be thus unwound, assuming its place in a natural manner in the guides 5, 6, 7. It will then suffice to attach the front end of the hood to the front ends of the guides or to the wind shield.

The construction shown in Figs. 6 to 9 differs chiefly from the foregoing from the fact that the columns are raised by means of a liquid delivered by a compressor into vertical cylinders coacting with pistons supporting the said columns.

Within the walls of the vehicle body, whose thickness is exaggerated in Fig. 7 for the sake of clearness, are disposed the cylinders 36 coacting with the pistons moved by a suitable liquid such as oil. The oil is contained in a tank 37 placed forwardly of the dashboard and connected through a valve 38 with a compressor 39 which can be set running by a pedal 40$^a$ for clutching purposes whereby an axially movable pinion 40 is engaged with the engine flywheel 40$^b$, which is usually toothed the disengagement of the pinion 40 from the flywheel 40$^b$ being effected by axially displacement by means of a spring 40$^c$.

The oil under pressure raises a valve 41 and circulates through a pipe 42 into a tank 43 from which there are branched six conduits 44 connecting said tank with the cylinders 36 through the needle valves 45. The latter are regulated once for all in such manner that in spite of the different losses of pressure in the various conduits 44, the same pressure will prevail under each piston, so that all of the columns will be raised at a uniform rate.

Upon the rods 36$^a$ of each of the three pistons on one side of the vehicle are mounted the sleeves 46, 47, 48 of square cross-section whose closed top serves to support the guides of the hood. Upon two opposite faces, the said sleeves comprise the bars 49 of trapezoidal or like cross section which are slidable in corresponding slots in the lower stationary columns and serve to guide the motion of the said sleeves.

The sleeve 46 carries upon both faces, and the sleeve 47 upon one face only, the guides 50 for the glass windows of the doors 11 and 12, whilst the sleeves 47 and 48 carry upon their oppositely situated faces the guides 51 for the rear glass pane.

The upper part of the sleeve 48 has a suitably curved outline corresponding to the shape of the carriage body when the vehicle is closed.

When the sleeves forming the upper columns have attained the end of the upward stroke, the compressor is stopped. The oil pressure is constantly indicated by the pressure gauge 52. The guides of the hood are unfolded, and the hood is spread out upon the vehicle body as shown in Figs. 1 to 5.

When the vehicle is to be converted into a torpedo, the hood and its guides are folded back, and the driver opens a needle valve 53 to enable the oil to flow from the cylinders into the oil tank 37.

Due to the automatic control of the columns which is thus obtained, I provide a simple apparatus with a resulting economy and at the same time eliminate the noise occasioned by the jarring effects and by the shocks of the road, and also to the play between the different gear wheels.

The guides of the hood consist of structural bars, for instance of duralumin; they are link connected at 9ª and 10ª and have the cross section shown at 54 in Fig. 9 whereby the joint between the vehicle body and the hood will be made fluidtight.

The hood consists of the metal members 55 (Fig. 8), made preferably of duralumin, whose cross section is somewhat of an S shape and which are mutually engaged as shown in Fig. 8.

To each of the said members is secured a forked holder 56 in which is revoluble a roller 57 preferably of fibre; all of the rollers of the hood roll in the guides 54, as shown in Fig. 9.

The axles of the said rollers are connected together in pairs by the plates 58 (analogous to roller chain plates) so as to provide for the mutual engagement of the members 55 while at the same time allowing the proper flexibility for the framing of the hood thus constructed.

One end of the hood is attached, as above stated, to the drum 25 disposed in the box 24 provided at the rear of the vehicle body. The hood passes under a drum 59, and it is actuated by a pair of pinions 34 by means of the crank 33.

In the third form of construction (Figs. 10 to 18) the columns as well as the hood are controlled by one of the pinions of the change speed box 60 by means of a jaw clutch or the like, which is actuated by the rod and link gear 61 connected with a hand lever or a pedal, not shown, and the motion is imparted to a set of gearing which is contained in a casing 62 to be further described.

A shaft 63, controlling the motion of the hood, leads from the casing 62 which is also traversed by a shaft 64 perpendicular to the shaft 63 and actuating—by bevel gearing—the two shafts 65 which are parallel to the side beams 66 of the vehicle frame.

To the upper part of said beams are secured at intervals the supports 67 which are laterally separated from the side beams by the buffers 68 of rubber or the like, and to which are secured the auxiliary side beams 69.

To the latter, and adjacent each of the uprights 74—74ª—74ᵇ—74ᶜ, is secured a casing 70 which is made in two parts and is traversed by the shaft 65, and which also serves as a step bearing for a screwthreaded shaft 71 actuated from the shaft 65 by means of the two bevel pinions 72.

To the said casing is secured a two-part sheath 73 within which the respective column can be displaced; each column, 74 for instance, is pierced axially to give passage to the shaft 71, which according to the direction of its rotation will raise or lower the column inasmuch as the latter is secured to a nut 75 in which the shaft 71 can be screwed and unscrewed. The upright is guided in its sheath due to the fact that it has inserted into each of its opposite sides two straight-edges 77ª, for instance of brass, in each of which is formed a groove in which is engaged a rightangled part of the sheath 73 which is slidable in the said groove.

Between the rear column and the adjacent intermediate column, the shaft 65 is divided into two parts situated at a certain angle and connected together by a universal joint member 76 so as to pass above the rear axle. I may substitute a flexible member for the two parts of the shaft 65. To allow the shafts 65 to follow the deformations of the vehicle frame, I provide elastic couplings 77 at intervals along the said shafts 65.

The hood is controlled in the same manner as in the preceding constructions. When the vehicle is open, it is wound on the drum 25 which is placed in the box 24 disposed at the rear of the vehicle body. The shaft of the drum 25 is mounted in suitable bearings and is rotated by the two pinions 26 mounted at the respective ends of the drum, each pinion being connected by a chain 27 to the sprocket wheels 28 and 29 which are mounted on the respective transverse shafts 30 and 31.

Upon the shaft 31 is mounted a bevel pinion 78 which is driven by a like pinion mounted on the end of an inclined shaft 63 actuated by a set of gearing contained in the casing 62, with interposition of the elastic coupling 77. When the shaft 63 is rotated in one or the other direction, this will draw out the hood when the columns are raised, or will cause the hood to be wound upon the drum 25 when the vehicle is to be opened.

The various movements which are imparted to the shafts 65 and 63 are transmitted, as above mentioned, by gearing contained in the casing 62. The transmission of the selected pinion of the change-speed box 60 to the said gearing is effected through a secondary shaft 80 provided with two elastic couplings 77.

The shaft 80 enters the said casing 62 and therein carries a spur gear wheel 81 which is provided on its outer face with clutching teeth 81ª and is in gear engagement with a pinion 82 secured to a bevel pinion 83, these two pinions being loose on a shaft 84.

The pinion 83 is in gear engagement with the two bevel pinions 85—86 which are mounted loose and adjacent one another on the shaft 64, and engage a fourth bevel pinion 87 which is secured to a spur pinion 88 and is loose on a shaft 89. Upon their adjacent faces the pinions 85—86 are provided with clutching teeth 85ª, 86ª.

The spur pinion 88 is in gear engagement with a like pinion 90 which is loose on the shaft 63 and is provided on its outer face with clutching teeth 90ª. The shaft 63 turns in a recess in the pinion 81. A socket 91 which is slidable on the shaft 63 but is rotatable with the latter, is provided with clutch teeth on both faces, said teeth coacting with the like teeth 81ª or 90ª according as the socket 91 is moved in one or the other direction on the shaft 63 by the fork 92 which is connected by rod and link gear, not shown, with a pedal or a lever for the driver's use.

Due to the four bevel pinions 83—85—86—87, the spur pinion 90 will turn in the contrary direction to the pinion 81, so that when the socket 91 is moved one way or the other, the shaft 63 will rotate in one direction or the other, whereby the hood will be moved forward upon the vehicle or will be wound upon the drum 25.

On the shaft 64 is mounted—in the same manner as the socket 90—a socket 92 carrying clutch teeth on both faces which will engage either the clutch teeth 85ª or 86ª according to the movement of the said socket by the fork 93. Since the two pinions 85—86 turn in opposite directions, the socket 92 can be engaged with the pinion 85 or the pinion 86, thus rotating the shaft 64 in the corresponding direction and hence rotating the shafts 65, whereby the columns 74, 74ª, 74ᵇ, 74ᶜ will be raised or lowered.

To conceal the sheaths 73 and to provide the proper curved outline for the vehicle body, the said columns and their sheaths are covered by the panels 94.

The hood further comprises a leather curtain or flap 1 which is suitably attached to the steel plates 95 and has a sufficient width to be brought down upon the latter at their ends. Near these ends are mounted the members 96 on which the rollers 97 are rotatably mounted. The rollers 97, like the rollers 4 of Figs. 1–5, form by their succession a sort of rack serving to draw the hood in one direction or the other inasmuch as they engage the pinions 34 having suitably shaped teeth which are mounted near each end of the shaft 30.

The guides in which the hood moves when the columns are raised consist of the metal members 98, 98ª, 98ᵇ having at the side a lengthwise slot for the insertion of the supports 96 of the rollers 97, as well as two projections 99 for guiding the said rollers which roll between them as between two rails. The members 98, 98ª, 98ᵇ are secured to the respective wooden bars 100, 100ª, 100ᵇ.

At each side of the vehicle, the guides for the hood thus formed are divided into three parts 98—100; 98ª—100ª; 98ᵇ—100ᵇ; the part 100 is secured in a known manner to the columns 74 and 74ª, whilst the parts 100ª and 100ᵇ are hinged at 113 to the columns 74ᶜ and 74ᵇ so as to follow the motion of the doors on their respective hinges 114 when the columns are lowered.

Each of the columns 74ª and 74ᵇ comprise a projection 101 which serves as an abutment for the door.

Each door consists of two panels 102—103 connected together by the sliding members 104 which are joined by flat strips 105ª to two straight bars 105 each of which is secured to the respective panel 102, 103 and which are grooved to assure the sliding of the member 104 bearing the glass window 106. The inner panel 103 of each door is grooved at 107 for the insertion of a tongue 108 mounted on the bars 100ª and 100ᵇ whereby the said bars will participate in the opening and closing movements of the corresponding doors.

When the guides are raised with the said columns in order to receive the hood, the tongue 108 serves as an abutment for the glass window 106 when the latter is raised.

At the upper end of each column 74ª and 74ᵇ is mounted a metal member 109 in which is pivoted a latch or bolt 110 urged by a spring 111 so that the rear end of the latch will bear upon the top of the corresponding half-sheath 73. When the columns are raised, the rear end of the latch is disengaged, and the front end of the latch, which is raised by a spring 111, will be engaged in a mortise 112 in the guide, so as to prevent the latter from turning towards the exterior.

Having thus described my apparatus, what I claim as new therein, and my own invention, is:—

1. In a convertible carriage-work for motor vehicles, the combination of a sliding curtain adapted to close the top and the rear of the vehicle, a slide upon each side adapted to serve as a guide for the said curtain, uprights carrying the said slides and so adapted as to be able to be raised above the body when the vehicle is to be closed and to be concealed in the walls of the said body when the vehicle is to be open, controlling means to produce the descent and the ascent of the said uprights and the sliding of the said curtain through the engine of the vehicle, a central box adapted to control the motions of the said uprights and of the said curtain, a clutch interposed between the said box and the said engine, the said box containing transmission members, clutches and a change speed gear, the said means for controlling the uprights comprising a nut at the lower end of each of the said uprights, a threaded rod upon which the said nut is screwed, a case in which is revolubly mounted the lower end of the said rod and transmission means adapted to connect the said transmission means with the transmission members contained in the said central box, a sheath made of two parts upon each of the said cases and in which can slide the respective upright, the two parts of this sheath being so arranged as to have a slot provided therebetween, projections formed upon the upright and passing outwardly through the said slot, these projections being adapted to serve as a leaf or fly for the corresponding door of the said vehicle.

2. In a convertible carriage-work for motor vehicles, the combination of a sliding curtain adapted to close the top and the rear of the vehicle, a slide upon each side adapted to serve as a guide for the said curtain, uprights carrying the said slides and so adapted as to be able to be raised above the body when the vehicle is to be closed and to be concealed in the walls of the said body when the vehicle is to be open, controlling means to produce the descent and the ascent of the said uprights and the sliding of the said curtain through the engine of the vehicle, a central box adapted to control the motions of the said uprights and of the said curtain, a clutch interposed between the said box and the said engine, said box containing transmission members, clutches and a change speed gear, the said means for driving or controlling the uprights comprising a nut at the lower end of each of the said uprights, a threaded rod upon which the said nut is screwed, a case in which is revolubly mounted the lower end of the said rod and transmission means adapted to connect the said transmission means with the transmission members contained in the central box, a sheath made of two parts upon each of the cases and in which can slide the respective upright, the two parts of this sheath being so arranged as to have a slot provided therebetween, two guide-bars upon two opposite sides of the said upright and in which are provided grooves, the two parts of the said sheath comprising a rectangular bending adapted to be engaged and to slide in one of the said grooves.

3. In a convertible carriage-work for motor vehicles, the combination of a sliding curtain adapted to close the top and the rear of the vehicle, a slide upon each side, adapted to serve as a guide for the said curtain, uprights carrying the said slides and so adapted as to be able to be raised above the body when the vehicle is to be closed and to be concealed in the walls of the said body when the vehicle is to be open, controlling means adapted to produce the descent and the ascent of the said uprights and the sliding of the said curtain through the engine of the vehicle, a central box adapted to control the motions of the said uprights and of the said curtain, a clutch interposed between the said box and the said engine, the said box containing transmission members, clutches and a change speed gear, each one of the said slides comprising three parts, the first part being secured to the two first uprights and the second and third parts being hinged to the third and fourth uprights so as to be able to follow the movement of the vehicle doors when the said uprights are lowered, sheaths made of two parts upon each side of the vehicle and in each of which can slide the said uprights, a metal part at the upper end of each of the said uprights, a latch linked to the said part, a spring adapted to cause the engagement of the nose of the said latch or bolt with one of the said movable parts of the slide when the uprights are raised, the said latch being adapted to meet the sheath of the respective upright when the upright is lowered so as to disengage the nose of the said latch of the movable part of the slide.

4. In a convertible carriage-work for motor vehicles, the combination of a sliding curtain adapted to close the top and the rear of the vehicle, a slide upon each side adapted to serve as a guide for the said curtain, uprights or columns carrying the said slides and so adapted as to be able to be raised above the body when the vehicle is to be closed and to be concealed in the walls of the said body when the vehicle is to be open, controlling means allowing to produce the descent and the ascent of the said uprights and the sliding of the said curtain through the engine of the vehicle, a central box adapted to control the motions of the said uprights and of the said curtain, a clutch interposed between the said box and the said engine, the said box containing transmission members, clutches and a change speed gear, every one of the said slides comprising several members, the first member being attached to the two first uprights and the others being connected by means of hinges to the corresponding uprights so as to be able to follow the movements of the carriage doors when the said uprights are lowered, casings on each side of the carriage in which the said uprights can slide and locking means mounted upon the uprights and upon the slide elements and adapted to render the said elements with the uprights except when the latter are in their low position, the said locking means being automatically unlocked in this position in virtue of their engagement with the stationary part of the body.

In testimony whereof I have hereunto affixed my signature.

CHARLES HOCH.